July 15, 1930.  L. E. GODFRIAUX  1,770,515
SELF GRIPPING CHUCK
Filed Oct. 13, 1928
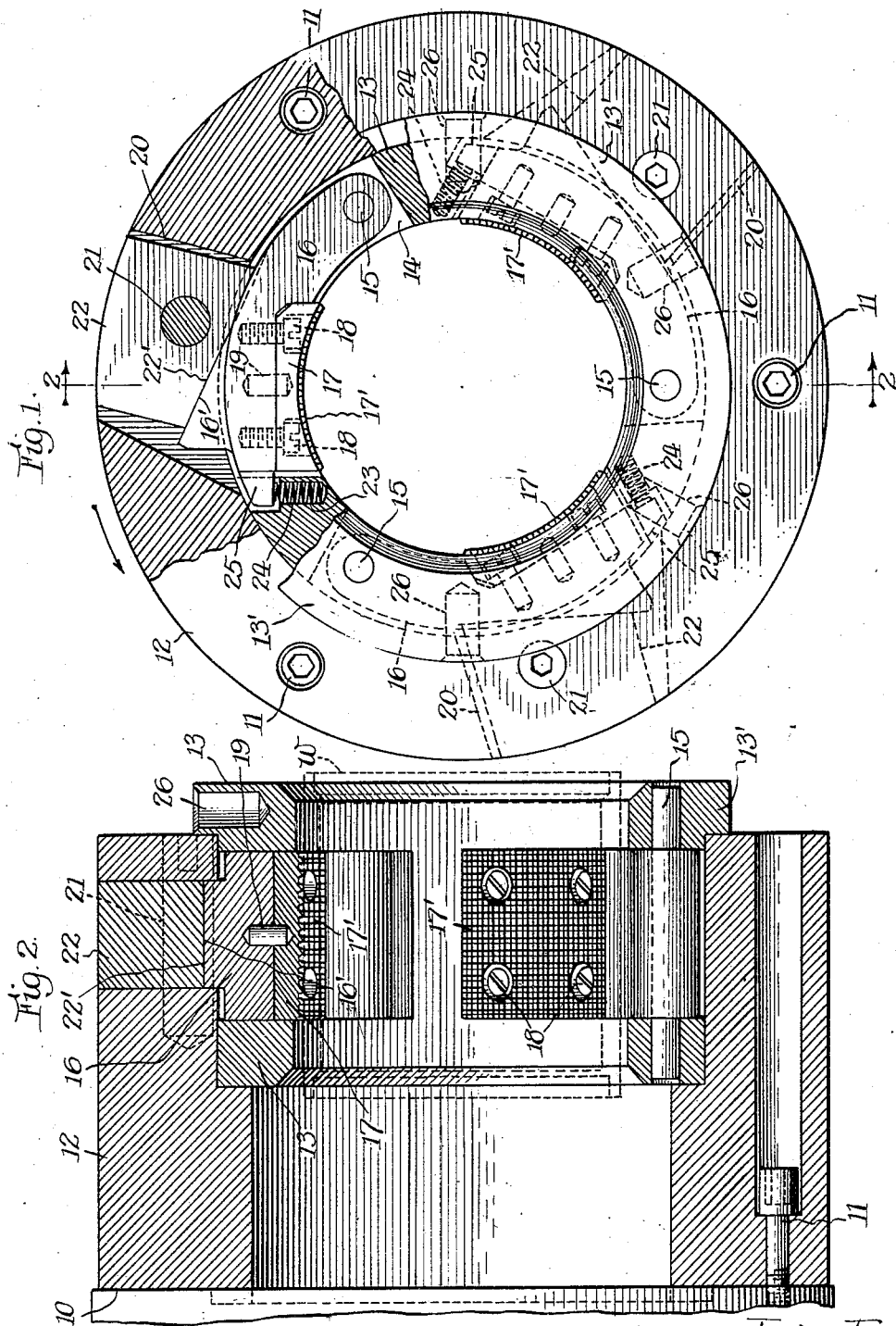
Inventor
Louis E. Godfriaux,
By Fisher, Clapp, Soans & Pond, Attys.

Patented July 15, 1930

1,770,515

UNITED STATES PATENT OFFICE

LOUIS E. GODFRIAUX, OF MADISON, WISCONSIN, ASSIGNOR TO GISHOLT MACHINE COMPANY, OF MADISON, WISCONSIN, A CORPORATION OF WISCONSIN

SELF-GRIPPING CHUCK

Application filed October 13, 1928. Serial No. 312,237.

This invention relates to chucks for lathes and other machine tools employing workholding chucks, and has reference more particularly to a chuck wherein the gripping jaws are urged into gripping engagement with the work through the cooperative action of two relatively rotatable members having wedging or camming engagement with each other, both of said members being rotated by the spindle, the rotation of one of said members being retarded by the action of the tool against the piece being turned.

The principal object of the invention is to provide an improved, simple and easily manipulated chuck of the type wherein the jaws are normally spring-expanded to permit the placing of the work in the chuck, and wherein the jaws may first be brought into engagement with the work by a manual operation, and will then be caused to securely grip the work by the rotation of the chuck working against the resistance of the cutting tool on the work.

Other objects and attendant advantages of the invention will appear from the following detailed description, taken in connection with the accompanying drawing in which I have illustrated one simple and practical embodiment of the invention, and wherein—

Fig. 1 is a face elevation of the chuck, partially in section;

Fig. 2 is a diametric section on the line 2—2 of Fig. 1.

Referring to the drawing, 10 may designate the spindle face plate, to which is attached as by countersunk screws 11, or otherwise, an annular body member 12. The forward portion of the inner periphery of the body member 12 is annularly countersunk to receive and form a bearing for a ring 13, the front face of the ring 13 having a peripheral flange 13' overlapping the inner portion of the front face of the body member 12. The ring 13 is freely rotatable in the body member 12 and is formed with a series of spaced slots 14—three in number as herein shown—in which slots are pivotally mounted at 15 jaw holders 16, the inner face of the free end portion of each jaw holder 16 being shaped to form a seat for a hardened steel slip or jaw 17 that grips the piece to be worked on and is attached to the jaw holder 16 by countersunk screws 18 and a dowel pin 19. Of course, the jaw holder and jaw may be made in a single piece if desired, the object in making it in two pieces being to render it easier and cheaper to change jaws where there are varying diameters of work.

The body member 12 is formed with substantially radial slots 20 at points opposite the jaw holders 16; and in each of these slots 20 is mounted on a pivot pin 21 a hardened steel shoe 22. The inner face of the shoe 22 is inclined, as shown at 22' in a direction substantially tangential to the ring 13, and the outer or back wall of the jaw holder 16 is correspondingly inclined as shown at 16' to fit the incline 22' of the shoe 22, whereby, under a relative rotary movement of the jaw holder and shoe in one direction the wedging action occurs tending to force the jaw holder and jaw inwardly.

In the ring 13 adjacent to one end of each slot 14 is a spring pocket 23 in which is seated a thrust spring 24 that bears at its outer end against a nose 25 on the free overhanging end of the jaw holder 16, and normally urges the latter outwardly or in an unclutching direction. In the flanged periphery of the ring 13 that lies beyond the front face of the body member 12 are a number of wrench holes 26 to receive a bar wrench or handle for effecting a preliminary turning of the jaw-carrying ring 13. The inner faces of the jaws 17 are preferably toothed or serrated, as shown at 17' to secure a good bite on the work.

In chucking the work, with the jaws 17 in expanded position the operator places the work (represented in dotted lines at W in Fig. 2) into the chuck, and with a handle placed into one of the holes 26 he pushes the jaw-carrying ring 13 to the right, viewing Fig. 1, against the wedging action of the shoes 22 on the backs of the jaw carriers 16, which causes the latter and the jaws 17 to be collapsed against the work. He then removes the handle and starts the spindle rotating counterclockwise (viewing Fig. 1) in order to perform the required operation on the work W. As soon as the tool is brought into action against the work W, it tends to retard or hold back the rotation of the ring 13, which will cause the camming action of the shoes 22 on the backs of the jaw holders to force the jaws into the work. This will continue until the jaw has bitten into the work sufficiently to rotate it against the action of the cutting tool. By varying the angle between the driving shoes 22 and the jaw holders, this inward wedging action can be increased or decreased as desired. To loosen the work after the spindle is stopped it is necessary only to reinsert the handle in one of the holes 26 and turn the ring 13 to the left or counterclockwise viewing Fig. 1 until the wedging action between the surfaces 16' and 22' is removed, at which time the springs 24 will automatically force the jaws outwardly. Of course, the greater the load on the chuck, the greater will be the chucking effort of the device. By pivotally mounting the shoe 22 a more perfect cooperative camming effect is secured between the shoe and the jaw holder, and, furthermore, the pivotal mounting of the shoe makes possible the use of straight or flat cooperating cam surfaces 22' and 16', which are more easily made than cooperating curved cam surfaces.

While I have shown the invention embodied in a rotary chuck designed to cooperate with a fixed tool, it is manifest that the same principle could be embodied in a non-rotatable chuck cooperating with rotating tools brought into action from one or both sides of the work. While I have herein disclosed a preferred embodiment of the invention, I do not limit the latter to the structural details illustrated but reserve all such variations and modifications as fall within the spirit and purview of the claims.

I claim—

1. In a chuck, the combination of an annular chuck body, a slotted ring mounted to rotate freely on the inner periphery of said chuck body, a plurality of jaw carriers pivoted in the slots of said ring, jaws on the free ends of said carriers, and a corresponding plurality of jaw-actuating shoes pivotally mounted on said body, said carriers and shoes formed with cooperating wedging surfaces brought into action under a relative turning movement of said body and ring.

2. In a chuck, the combination of an annular slotted chuck body, a slotted ring rotatably mounted on the inner periphery of said chuck body, a plurality of jaw carriers pivoted at one end thereof in the slots of said ring, jaws on the free ends of said carriers, a corresponding plurality of jaw-actuating shoes pivotally mounted in the slots of said body, the outer sides of said carriers and the inner sides of said shoes being formed as cooperating wedging surfaces brought into action under a relative turning movement of said body and ring in one direction to force said carrier inwardly, and thrust springs seated in said ring and bearing against said carriers, said springs acting to force said carriers outwardly under a relative turning movement of said body and ring in the reverse direction.

3. In a chuck, the combination of a chuck body, a ring mounted on and freely rotatable relatively to said chuck body, a jaw carrier and jaw movably mounted on said ring, and a jaw actuating member mounted on said body, said carrier and jaw actuating member formed with cooperating wedging surfaces acting under a relative turning movement of said body and ring caused by engagement of a tool with the work gripped by said jaw.

LOUIS E. GODFRIAUX.